United States Patent
Sugahara

(10) Patent No.: US 9,254,593 B2
(45) Date of Patent: Feb. 9, 2016

(54) INJECTION MOLDING MACHINE

(71) Applicant: FANUC Corporation, Yamanashi (JP)

(72) Inventor: Keisuke Sugahara, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/678,009

(22) Filed: Apr. 3, 2015

(65) Prior Publication Data

US 2015/0283738 A1    Oct. 8, 2015

(30) Foreign Application Priority Data

Apr. 4, 2014   (JP) ................... 2014-077984

(51) Int. Cl.
| | | |
|---|---|---|
| B29C 45/64 | (2006.01) | |
| B29C 45/03 | (2006.01) | |
| B29C 45/17 | (2006.01) | |
| B29C 45/78 | (2006.01) | |
| B29C 45/77 | (2006.01) | |

(52) U.S. Cl.
CPC ............ B29C 45/03 (2013.01); *B29C 45/1761* (2013.01); *B29C 45/77* (2013.01); *B29C 45/78* (2013.01); *B29C 2045/1784* (2013.01)

(58) Field of Classification Search
CPC ...... B29C 45/78; B29C 45/77; B29C 45/1761
USPC ......................................... 425/144, 149, 589
See application file for complete search history.

(56) References Cited

U.S. PATENT DOCUMENTS

| | | |
|---|---|---|
| 6,030,200 A | 2/2000 | Ito et al. |
| 6,333,611 B1 | 12/2001 | Shibuya et al. |
| 2001/0015506 A1 | 8/2001 | Mizuno |
| 2011/0210461 A1* | 9/2011 | Kariya ................. B29C 45/762 425/144 |
| 2012/0009297 A1 | 1/2012 | Ochi |
| 2014/0072666 A1 | 3/2014 | Urushizaki et al. |
| 2015/0147422 A1* | 5/2015 | Maruyama .......... B29C 45/7666 425/149 |

FOREIGN PATENT DOCUMENTS

| | | |
|---|---|---|
| JP | 8-1721 A | 1/1996 |
| JP | 8-47938 A | 2/1996 |
| JP | 2000-141440 A | 5/2000 |
| JP | 2001-232672 A | 8/2001 |
| JP | 2012-16821 A | 1/2012 |
| JP | 2012-90518 A | 5/2012 |
| JP | 2013-18152 A | 1/2013 |
| JP | 2014-51047 A | 3/2014 |

OTHER PUBLICATIONS

Office Action mailed Jul. 21, 2015, corresponding to Japanese patent application No. 2014-077984.

* cited by examiner

*Primary Examiner* — Tim Heitbrink
(74) *Attorney, Agent, or Firm* — Hauptman Ham, LLP

(57) ABSTRACT

An injection molding machine is provided with an injection device, a mold clamping device, an electric storage device configured to supply electric power to the injection device and/or the mold clamping device, and a machine base. The machine base is provided with an upper frame, a lower frame, and support means supporting the upper frame on the lower frame, the injection device and the mold clamping device are disposed on the upper frame of the machine base, and the electric storage device is disposed on the lower frame. The electric storage device is formed of a case body and an electric storage unit therein.

10 Claims, 8 Drawing Sheets

INJECTION MOLDING MACHINE

RELATED APPLICATIONS

The present application claims priority to Japanese Application Number 2014-077984, filed Apr. 4, 2014, the disclosure of which is hereby incorporated by reference herein in its entirety.

BACKGROUND OF THE INVENTION

1. Field of the Invention

The present invention relates to an injection molding machine, and more particularly, to an injection molding machine with an electric storage device.

2. Description of the Related Art

In general, an injection device and a mold clamping device of an injection molding machine are driven by a servomotor, which is supplied with driving power from its drive unit to advance or retreat a screw and a movable platen for moving the mold clamping device. The injection device is expected to move the screw at high speed, and the mold clamping device is also expected to quickly move the movable platen that supports a mold, so that high electric power is required.

If a large servomotor is driven with high output in this case, high power must be supplied from an amplifier to the servomotor. However, a large-capacity transformer is needed in order to cover all the high power with electric power from a main power supply, so that the costs may be considerably increased. To solve this problem, there is a method in which an electric storage device is previously charged with electricity so that the high power required for high output can be derived from the electricity with which the electric storage device is charged. However, this method requires the electric storage device for high power charging to be installed separately from the injection molding machine.

Conventionally, the electric storage device of this type used to be disposed separately from the injection molding machine. In installing the injection molding machine, therefore, the installation location of the electric storage device must be secured independently of that of the injection molding machine. Since the electric storage device must be moved along with the injection molding machine, moreover, the movement may take time in some cases.

Japanese Patent Application Laid-Open No. 2000-141440 discloses a technique in which an electric storage device for supplying electric power to an injection device is disposed outside the injection molding machine, in a motor drive unit for an injection molding machine.

In either of the above prior art techniques, the electric storage device is disposed separately from the injection molding machine. As described above, therefore, the installation location of the electric storage device must be secured independently of that of the injection molding machine, and the electric storage device must be moved along with the injection molding machine, so that the movement may sometimes be time-consuming.

SUMMARY OF THE INVENTION

Accordingly, the object of the present invention is to provide an injection molding machine capable of being installed without requiring a wide space and moved easily.

An injection molding machine according to the present invention comprises an injection device, a mold clamping device, an electric storage device configured to supply electric power to the injection device and/or the mold clamping device, and a machine base. The machine base comprises an upper frame, a lower frame, and support means supporting the upper frame on the lower frame, the injection device and the mold clamping device are disposed on the upper frame of the machine base, and the electric storage device comprises a case body and an electric storage unit housed in the case body and is disposed on the lower frame of the machine base.

In the injection molding machine according to the present invention, the electric storage device for the power supply is disposed on the lower frame constituting the injection molding machine, so that it need not be located separately from the injection molding machine. Therefore, the installation location of the electric storage device need not be secured independently of that of the injection molding machine. Since the electric storage device and the injection molding machine are formed integrally with each other, moreover, they can move easily.

The electric storage unit may be a storage battery or a capacitor.

The electric storage unit may be enclosed by a plurality of screens. In this configuration example, the safety of machine operation after power supply connection can be improved.

A part of each of the screens may double as the support means of the machine base. Alternatively, the screens may double as the case body of the electric storage device. In this configuration example, the number of members used can be reduced to simplify the overall configuration.

The case body may have a handle. In this configuration example, the operating efficiency at the time of installation or transportation can be improved.

The electric storage device may be supported by the lower frame of the machine base with a buffer therebetween. In this configuration example, the electric storage device can be stably secured to the lower frame.

The electric storage device may be disposed on that part of the lower frame of the machine base below the mold clamping device. In this configuration example, the lower frame portion of the injection molding machine can be used effectively.

The injection molding machine may be configured so that the electric storage device is disposed side by side with a transformer on the lower frame of the machine base. In this configuration example, the lower frame portion of the injection molding machine can be used effectively.

According to the present invention, there can be provided an injection molding machine capable of being installed without requiring a wide space and moved easily.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

A first embodiment of an injection molding machine according to the present invention will first be described with reference to FIGS. 1 to 4.

Figure 1:
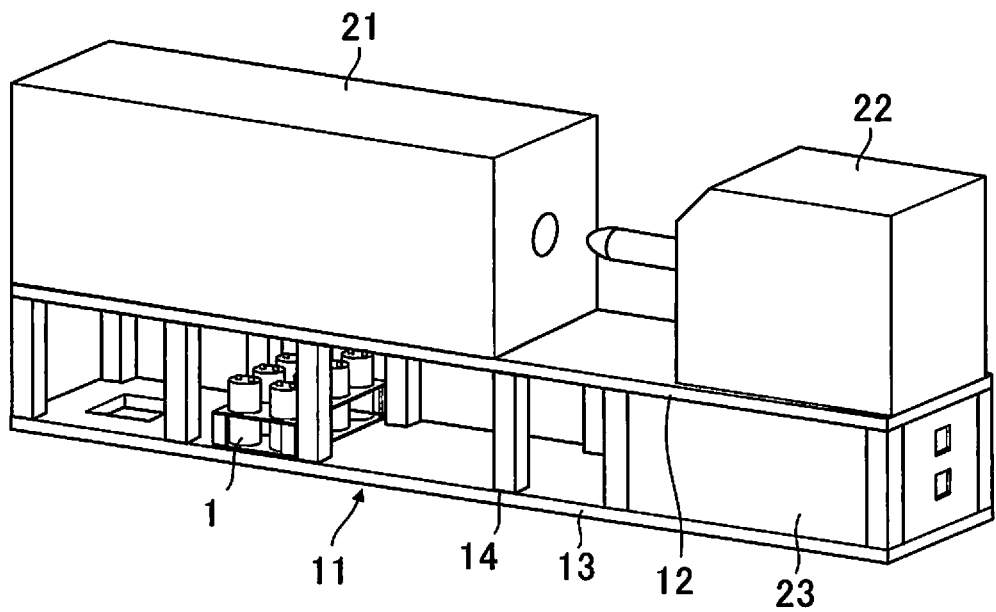
FIG. 1 is a view showing the configuration of a first embodiment of an injection molding machine according to the present invention.

FIG. 1 is a view showing the configuration of the injection molding machine according to the present embodiment.

A machine base 11 that constitutes the injection molding machine comprises an upper frame 12 and a lower frame 13. A plurality of support posts 14 are provided between these frames so that they support the upper frame 12 above the lower frame 13. A mold clamping device 21 and an injection device 22 are disposed on the upper frame 12. The mold clamping device 21 and the injection device 22 are each provided with at least one servomotor (not shown). As the servomotors are driven, a cylinder attached to the injection device 22 advances or retreats relative to the mold clamping device 21.

Further, the lower frame 13 is provided with an electrical equipment part 23 located below the injection device 22 and a capacitor unit 1 as an electric storage device located below the mold clamping device 21. The electrical equipment part 23 comprises a power supply device (not shown), which supplies electric power to the injection molding machine, and a controller (not shown) for controlling the injection molding machine. Further, the capacitor unit 1 is previously charged with electricity and supplies necessary power for the drive of the injection device 22 or the mold clamping device 21.

Figure 2:
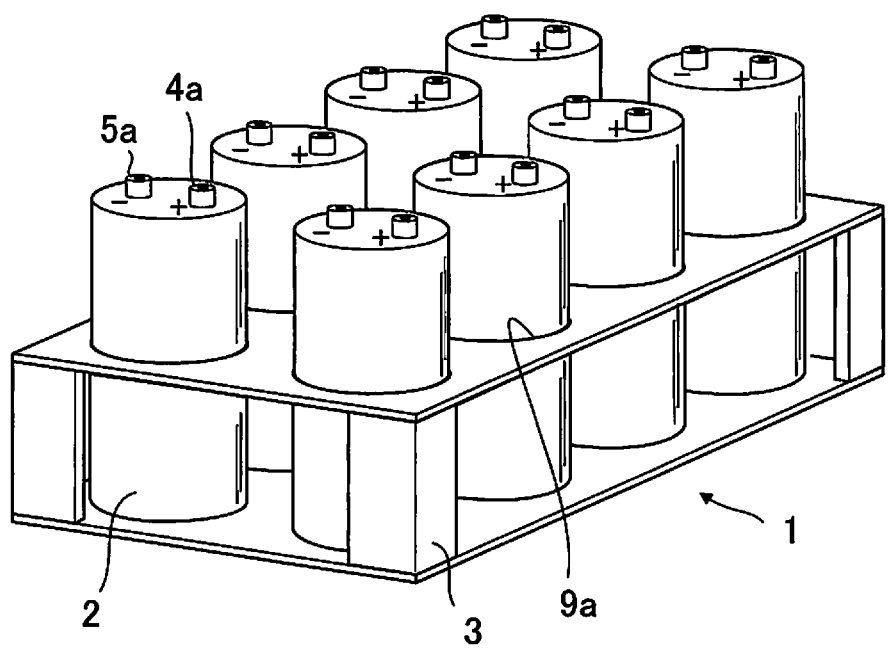
FIG. 2 is a view showing the configuration of a capacitor unit as an electric storage unit disposed in the injection molding machine of FIG. 1.

FIG. 2 is a view showing the configuration of the capacitor unit 1.

The capacitor unit 1 comprises cylindrical capacitors 2, each having a positive electrode terminal 4a and a negative electrode terminal 5a on one surface thereof, and a case body 3 with a plurality of holes 9a for positioning the capacitors 2. The capacitors 2 are aligned in the case body 3 in such a manner that their surfaces carrying the positive and negative electrode terminals 4a and 5a thereon are on the top side. The case body 3 is formed of a metal plate or a resin or plastic material. Although the capacitors 2 are arranged in two rows in the capacitor unit 1 of FIG. 2, they may alternatively be arranged in a row or in three or more rows.

Figure 3:
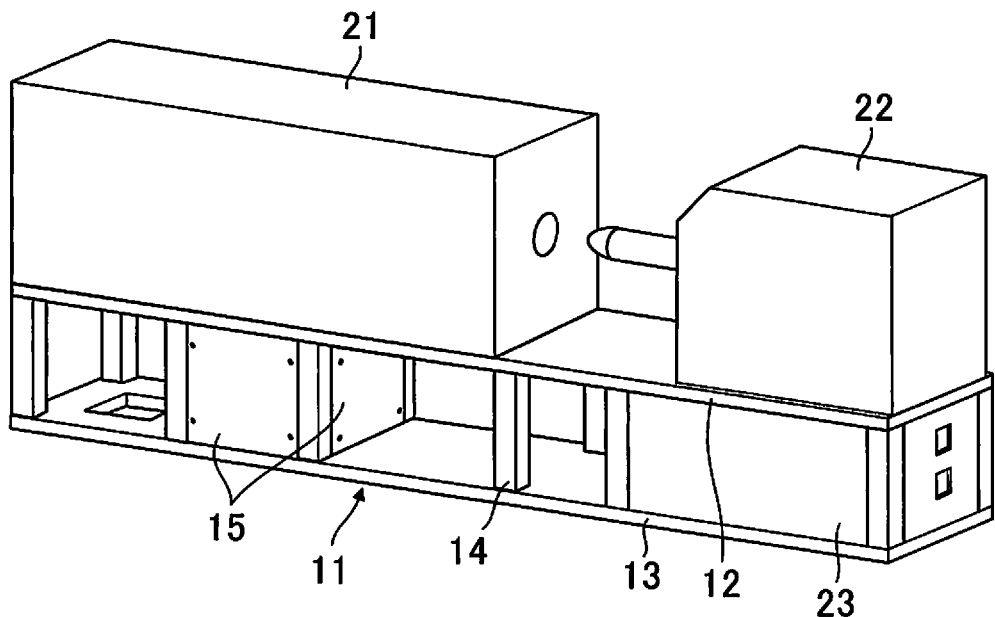
FIG. 3 is a view showing the configuration of a first modification of the first embodiment (FIG. 1) of the injection molding machine according to the present invention.

FIG. 3 is a view showing a first modification of the first embodiment (FIG. 1) of the injection molding machine according to the present invention.

In the injection molding machine shown in FIG. 3, screens 15 are arranged spanning between the support posts 14 so as to enclose the capacitor unit 1. The screens 15 are each formed of a metal plate or a resin or plastic material. With this configuration, the capacitor unit 1 for use as an electric storage device is shielded from the surroundings, so that the machine can be safely operated after it is connected to the power supply.

Figure 4:
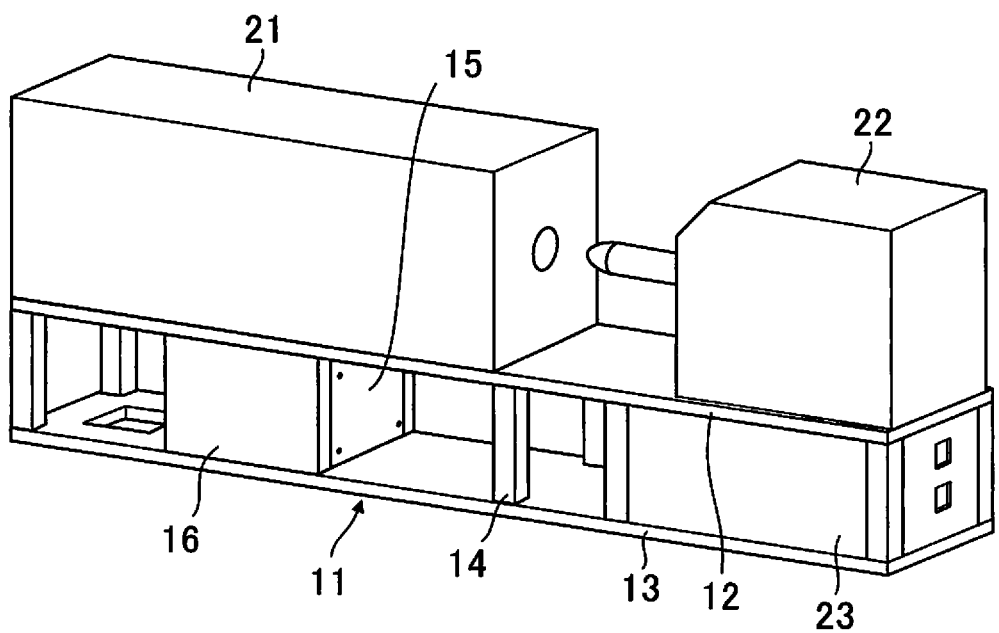
FIG. 4 is a view showing the configuration of a second modification of the first embodiment (FIG. 1) of the injection molding machine according to the present invention.

FIG. 4 is a view showing a second modification of the first embodiment (FIG. 1) of the injection molding machine according to the present invention.

In the injection molding machine shown in FIG. 4, screens are partially formed as support plates 16 that each connect two support posts. These support plates 16 are also each formed of a metal plate or a resin or plastic material. With this configuration, a part of each screen doubles as support means, so that the number of parts can be reduced.

The capacitor unit 1 is surrounded by six surfaces in total; upper and lower surfaces, two longitudinal surfaces, and two other surfaces extending perpendicular to the longitudinal direction within a horizontal plane. In the examples (first and second modifications) shown in FIGS. 3 and 4, each of the screens 15 or the support plates 16 is configured to cover one surface. Alternatively, however, a single screen may be configured to cover two or more surfaces or two or more screens may be used to cover a single surface. Although each screen is a rectangular structure in the examples shown in FIGS. 3 and 4, moreover, it may be replaced with a chamfered or cylindrical structure provided that it can enclose the capacitor unit 1 and the capacitors 2.

In the present embodiment, the capacitor unit 1 is disposed on that part of the lower frame 13 below the mold clamping device 21. However, the disposition of the capacitor unit 1 is not limited to this position, and the capacitor unit 1 may alternatively be disposed on that part of the lower frame 13 below the injection device 22 or arranged in parts. Further, power supplying to the capacitor unit 1 is not limited to the timing for the drive of the injection device 22 or the mold clamping device 21 and may also be performed at some other point in time.

A second embodiment of the injection molding machine according to the present invention will now be described with reference to FIGS. 5 and 6.

Figure 5:
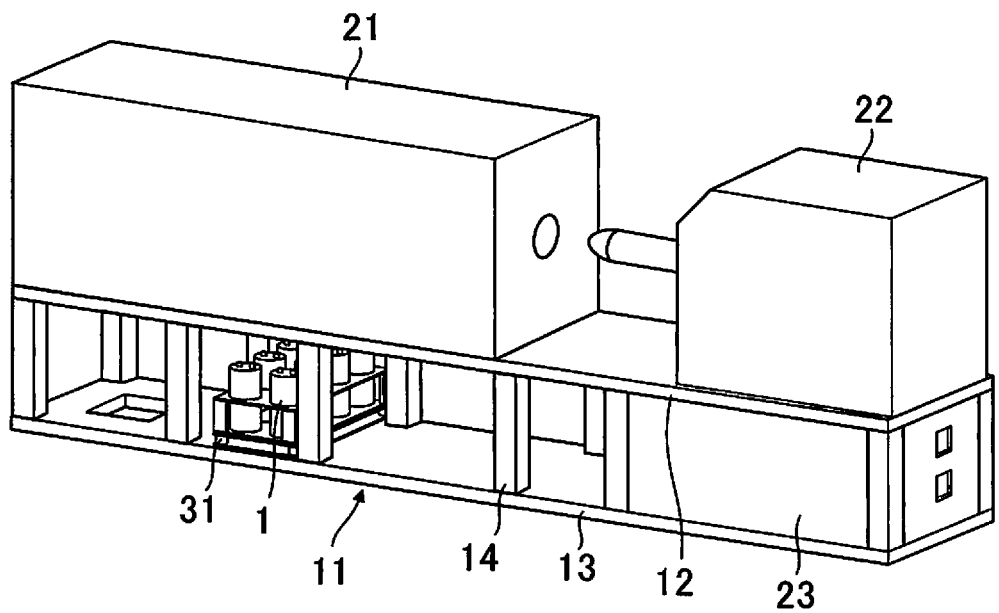
FIG. 5 is a view showing the configuration of a second embodiment of the injection molding machine according to the present invention.

FIG. 5 is a view showing the configuration of the injection molding machine according to the present embodiment.

In the present embodiment, a buffer 31 is provided on a lower frame 13 of a machine base 11 of the injection molding machine, and a capacitor unit 1 is supported by the lower frame 13 with the buffer 31 therebetween.

Figure 6:
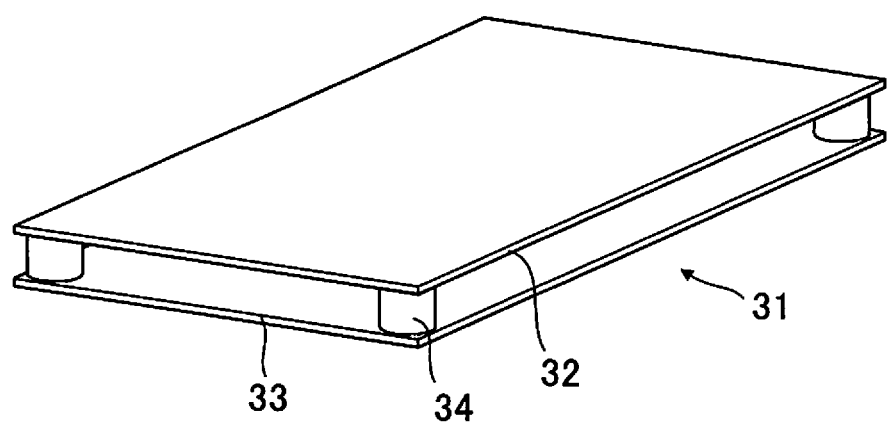
FIG. 6 is a view showing details of a buffer used in the injection molding machine of FIG. 5.

FIG. 6 is a view showing details of the buffer 31 used in the injection molding machine of FIG. 5.

The buffer 31 of the present embodiment is configured so that anti-vibration rubber blocks 34 are interposed between two plate members 32 and 33. The plate members 32 and 33 are each formed of a metal plate or a resin or plastic material.

With this configuration, shock and vibration of the machine transmitted to the capacitor unit 1 can be reduced.

Although the anti-vibration rubber blocks 34 are interposed between the plate members 32 and 33 in the present embodiment, they may be replaced with an anti-vibration rubber sheet 34. Further, only one of the plate members 32 and 33 may be used with the same effect or only the anti-vibration rubber blocks or sheet 34 may be used without the use of the plate members.

A third embodiment of the injection molding machine according to the present invention will now be described with reference to FIGS. 7 and 8.

The present embodiment differs from the first embodiment (FIG. 1), the first modification of the first embodiment (FIG. 3), the second modification of the first embodiment (FIG. 4), and the second embodiment (FIG. 5) in the layout of a capacitor unit 41 on the lower frame of the machine base.

More specifically, in the present embodiment, the capacitor unit 41 comprises a box-like case body 43, in which capacitors 2 are aligned in such a manner that their surfaces carrying positive and negative electrode terminals 4a and 5a thereon are on the top side. The case body 43 is formed of a metal plate or a resin or plastic material. Although the capacitors 2 are arranged in two rows in the capacitor unit 41, as shown in FIG. 7, they may alternatively be arranged in a row or in three or more rows.

The capacitors 2 can be configured to be enclosed by attaching an upper cover 10 after they are disposed in the case body 43. With this configuration, the capacitors 2 are shielded from the surroundings, so that the machine can be safely operated after it is connected to the power supply.

A handle 8 is provided on an end portion of the case body 43. A ready-made handle of a metal or resin material may be used for the handle 8. By the use of this handle 8, the operating efficiency at the time of installation or transportation can be improved.

Figure 7:
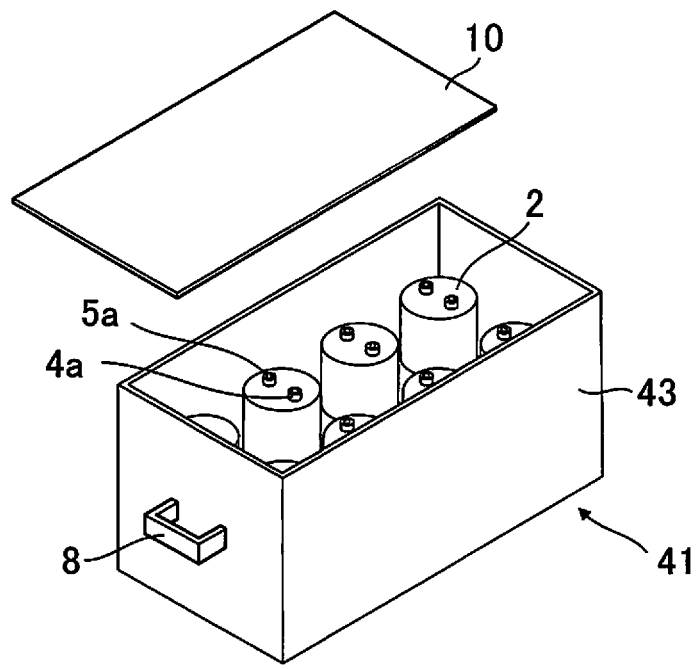
FIG. 7 is a view showing the configuration of a capacitor unit as an electric storage unit disposed in the second embodiment of the injection molding machine according to the present invention.
Figure 8:
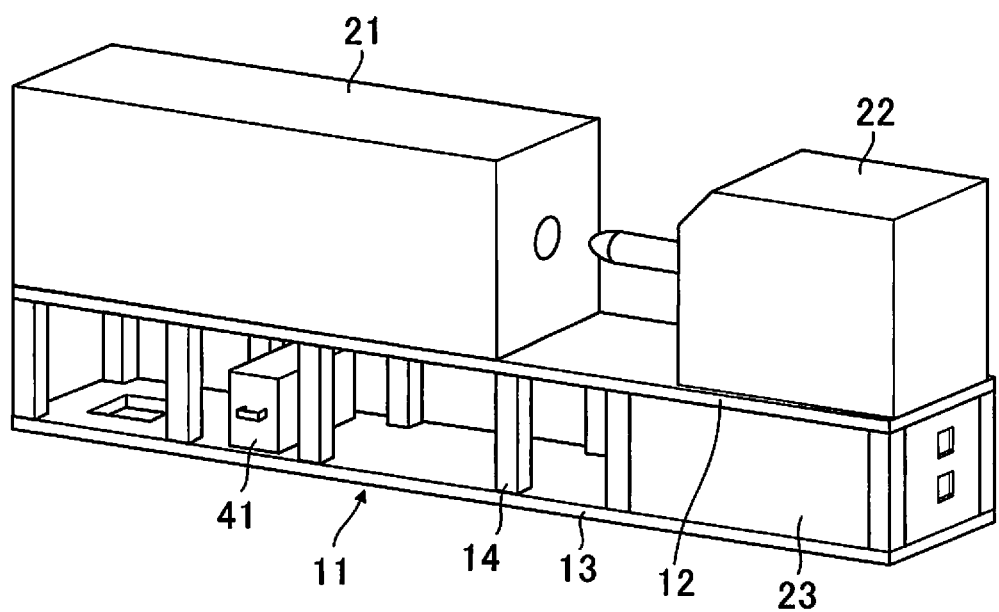
FIG. 8 is a view showing how the capacitor unit shown in FIG. 7 is attached to the injection molding machine.

FIG. 8 shows how the capacitor unit 41 shown in FIG. 7 is attached to the injection molding machine.

In the present embodiment, as shown in FIG. 7, the capacitors 2 are enclosed by the box-like case body 43, which hence serves as a screen. Thus, unlike their counterparts in the first embodiment, the capacitors 2 need not be covered by screens (screens 15 and 16 of FIGS. 3 and 4).

A fourth embodiment of the injection molding machine according to the present invention will now be described with reference to FIGS. 9 and 10.

In the first to third embodiments of the injection molding machine described above, the capacitor unit is used as the electric storage unit. In the present embodiment, however, a storage battery unit is used as the electric storage unit. More specifically, in this embodiment, a storage battery unit 51 is disposed (in place of the capacitor unit 1) on that part of the lower frame of the machine base below the mold clamping device.

Figure 9:
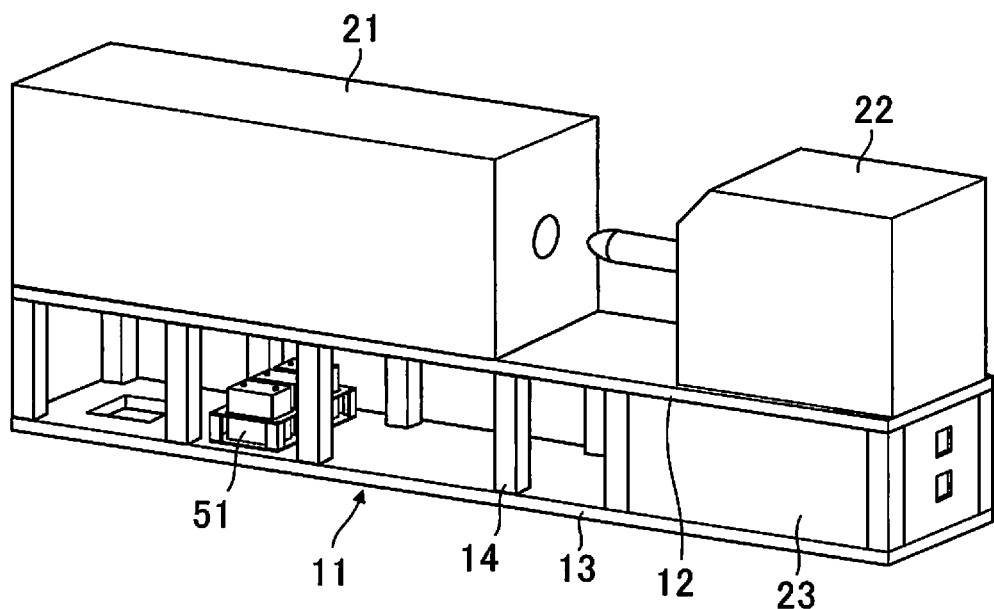
FIG. 9 is a view showing the configuration of a fourth embodiment of the injection molding machine according to the present invention.
Figure 10:
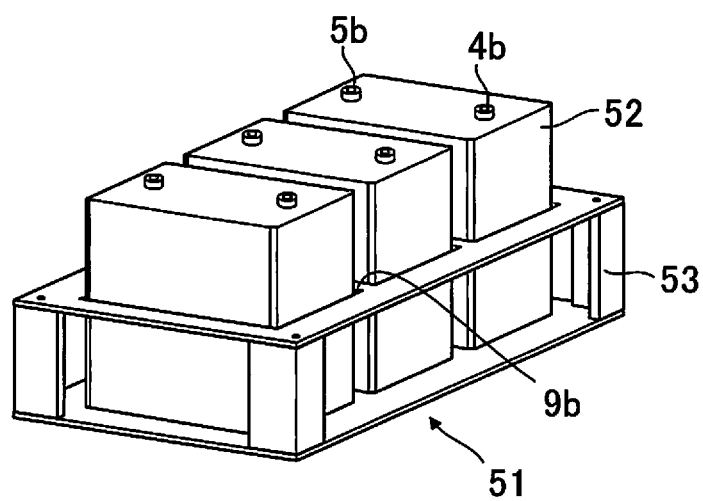
FIG. 10 is a view showing the configuration of a storage battery unit as an electric storage unit disposed in the injection molding machine of FIG. 9.

FIG. 10 is a view showing the configuration of the storage battery unit 51 disposed in the injection molding machine of FIG. 9.

The storage battery unit 51 comprises cuboid storage batteries 52, each having a positive electrode terminal 4b and a negative electrode terminal 5b on one surface thereof, and a case body 53 with a plurality of holes 9b for positioning the storage batteries 52. The storage batteries 52 are aligned in the case body 53 in such a manner that their surfaces carrying the positive and negative electrode terminals 4b and 5b thereon are on the top side. The case body 53 is formed of a metal plate or a resin or plastic material. Although the plurality of storage batteries 52 are used in the storage battery unit 51 of FIG. 10, only a single storage battery may be used instead. Although the storage batteries 52 are arranged in a row in the storage battery unit 51 of FIG. 10, moreover, they may alternatively be arranged in a plurality of rows.

Also in the present embodiment, screens 15 may be arranged spanning between support posts 14 so as to enclose the storage battery unit 51, as shown in FIG. 3 (for the first modification of the first embodiment) or screens may be partially formed as support plates 16 that each connect two support posts, as shown in FIG. 4 (for the second modification of the first embodiment). With this configuration, the storage battery unit 51 for use as an electric storage device is shielded from the surroundings, so that the machine can be safely operated after it is connected to the power supply, or a part of each screen doubles as support means, so that the number of parts can be reduced.

The storage battery unit 51 is surrounded by six surfaces in total; upper and lower surfaces, two longitudinal surfaces, and two other surfaces extending perpendicular to the longitudinal direction within a horizontal plane. In the examples (first and second modifications of the first embodiment) shown in FIGS. 3 and 4, each of the screens 15 or the support plates 16 is configured to cover one surface. Alternatively, however, a single screen may be configured to cover two or more surfaces or two or more screens may be used to cover a single surface. Although each screen is a rectangular structure in the examples shown in FIGS. 3 and 4, moreover, it may be replaced with a chamfered or cylindrical structure provided that it can enclose the storage battery unit 51 and the storage batteries 52.

In the present embodiment, the storage battery unit 51 is disposed on that part of a lower frame 13 below a mold clamping device 21. However, the disposition of the storage battery unit 51 is not limited to this position, and the storage battery unit 51 may alternatively be disposed on that part of the lower frame 13 below an injection device 22 or arranged in parts. Further, power supplying to the storage battery unit 51 is not limited to the timing for the drive of the injection device 22 or the mold clamping device 21 and may also be performed at some other point in time.

As in the second embodiment shown in FIG. 5, moreover, a buffer 31 may be provided on the lower part of the storage battery unit 51 so that the storage battery unit 51 is supported by the lower frame 13 with the buffer 31 therebetween. The buffer 31 is constructed in the same manner as in the second embodiment.

A fifth embodiment of the injection molding machine according to the present invention will now be described with reference to FIGS. 11 and 12.

In the foregoing fourth embodiment (FIG. 9), the storage battery unit 51 is mounted on the lower frame 13 of the machine base 11 of the injection molding machine and enclosed by the screens 15 (FIG. 3) or the support plates 16 (FIG. 4). In the present embodiment, however, a storage battery unit 61 is configured in the form of a box-like case body 63, as shown in FIG. 11.

Figure 11:
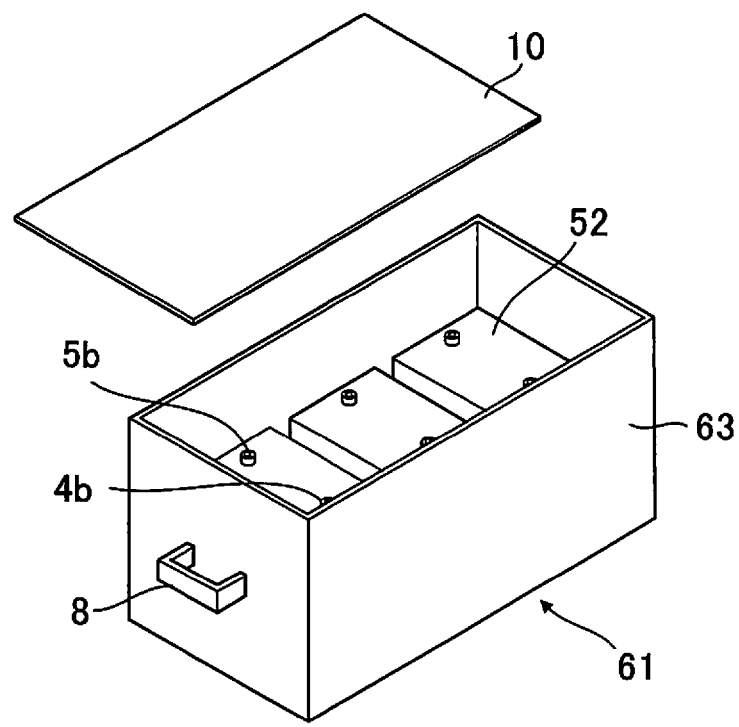
FIG. 11 is a view showing the configuration of a storage battery unit as an electric storage unit disposed in a fifth embodiment of the injection molding machine according to the present invention.

More specifically, in the present embodiment, the storage battery unit 61 comprises the box-like case body 63, in which storage batteries 52 are aligned in such a manner that their surfaces carrying positive and negative electrode terminals 4b and 5b thereon are on the top side, as shown in FIG. 11. The case body 63 is formed of a metal plate or a resin or plastic material. Although the plurality of storage batteries 52 are used in the storage battery unit 61 of FIG. 11, only a single storage battery may be used instead. Although the storage batteries 52 are arranged in a row in the storage battery unit 61 of FIG. 11, moreover, they may alternatively be arranged in a plurality of rows.

The storage batteries 52 can be configured to be enclosed by attaching an upper cover 10 after they are disposed in the case body 63. With this configuration, the storage batteries 52 are shielded from the surroundings, so that the machine can be safely operated after it is connected to the power supply.

A handle 8 is provided on an end portion of the case body 63. A ready-made handle of a metal or resin material may be used for the handle 8. By the use of this handle 8, the operating efficiency at the time of installation or transportation can be improved.

Figure 12:
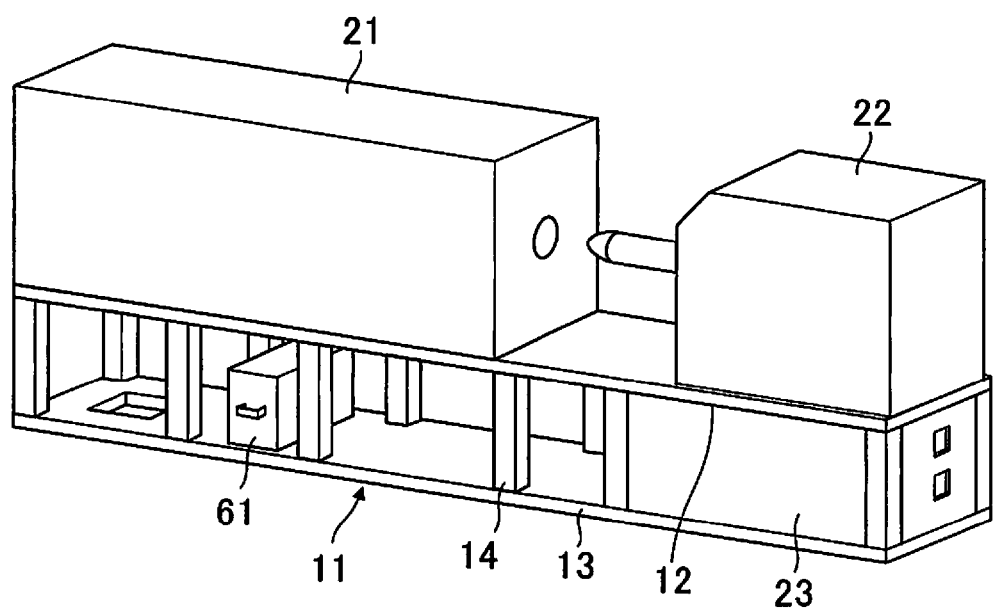
FIG. 12 is a view showing how the storage battery unit shown in FIG. 11 is attached to the injection molding machine.

FIG. 12 shows how the storage battery unit 61 shown in FIG. 11 is attached to the injection molding machine.

In the present embodiment, as shown in FIG. 11, the storage batteries 52 are enclosed by the box-like case body 63, which hence serves as a screen. Thus, unlike their counterparts in the fourth embodiment, the storage batteries 52 need not be covered by screens (see screens 15 and 16 of FIGS. 3 and 4).

A sixth embodiment of the injection molding machine according to the present invention will now be described with reference to FIGS. 13 and 14.

Figure 13:
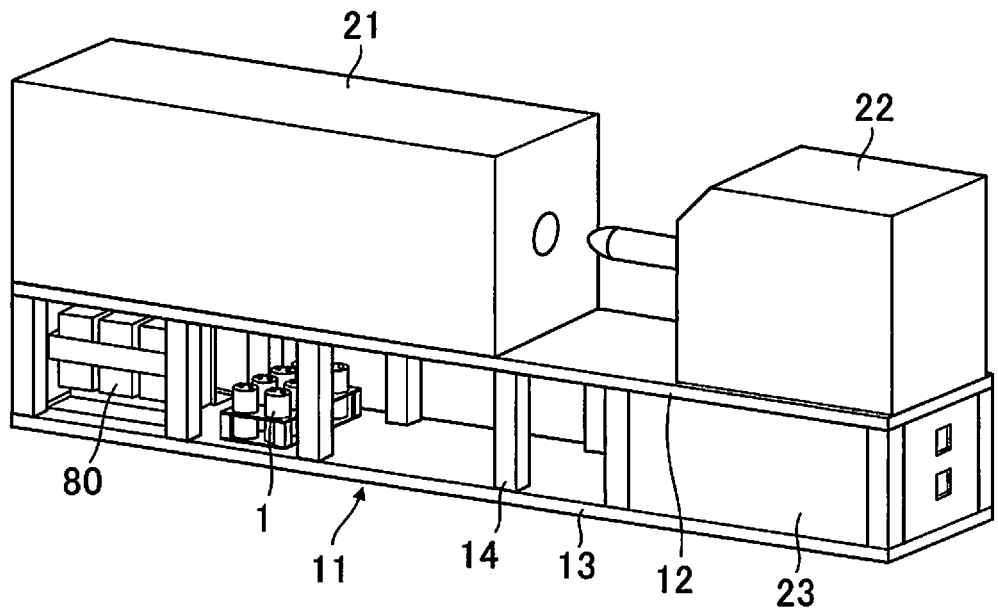
FIG. 13 is a view showing an example of the configuration of a sixth embodiment of the injection molding machine according to the present invention.

FIG. 13 is a view showing the configuration of the injection molding machine according to the present embodiment. In addition to the capacitor unit 1 of the first embodiment shown in FIG. 1, a transformer 80 for transforming a voltage supplied from a plant into a voltage necessary for the injection molding machine is mounted on a lower frame 13 of a machine base 11, according to the present embodiment.

Figure 14:
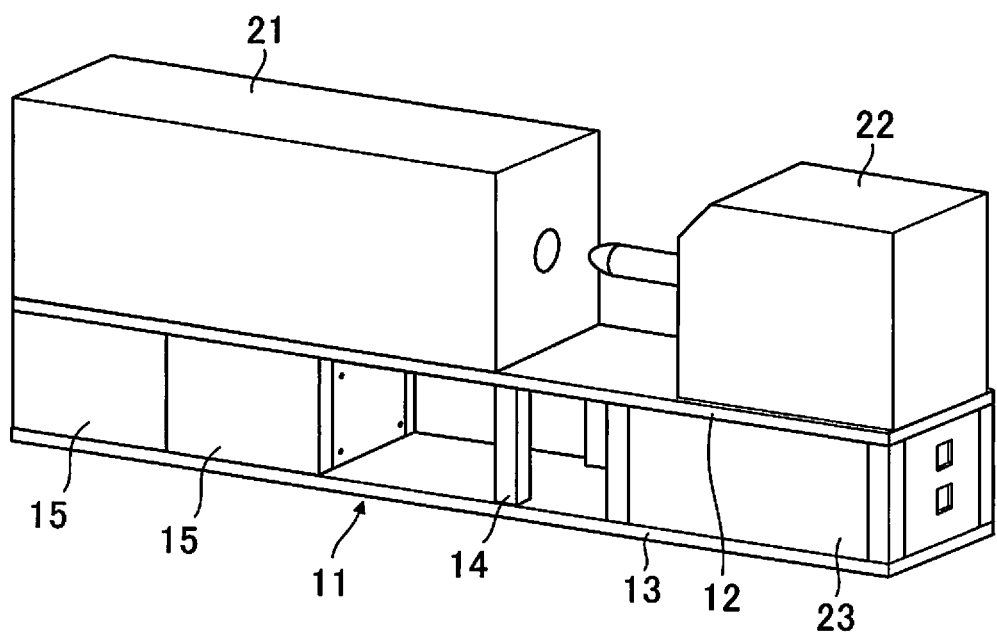
FIG. 14 is a view showing another example of the configuration of the sixth embodiment of the injection molding machine according to the present invention.

Also in the present embodiment, the capacitor unit 1 and the transformer 80 can be configured to be enclosed by screens, as shown in FIG. 14, after they are mounted on the lower frame 13 so that the machine can be safely operated after it is connected to the power supply. Further, the capacitor unit 1 of FIG. 1 to be mounted may be replaced with the capacitor unit 41 of FIG. 7.

Figure 15:
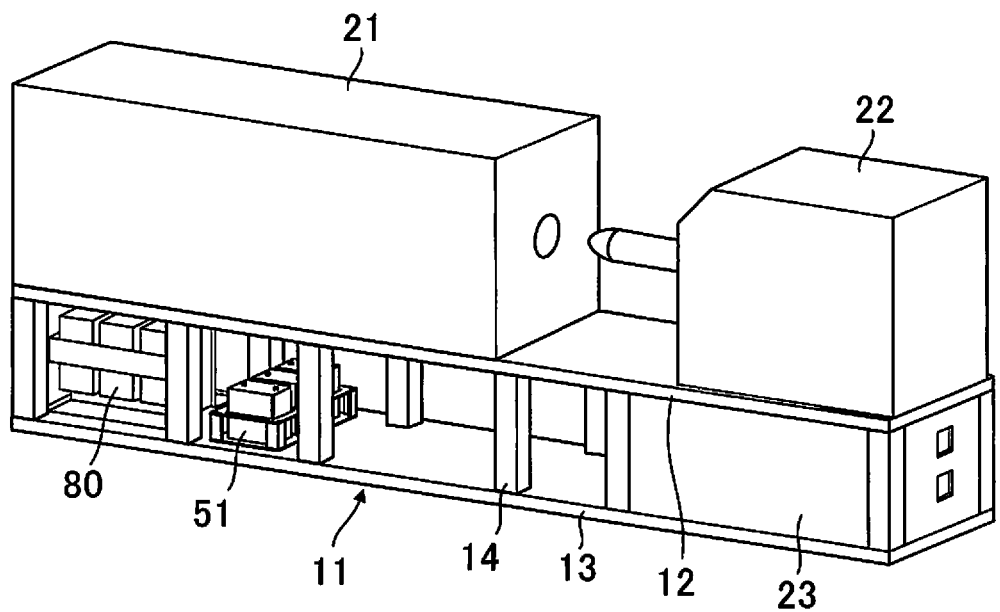
FIG. 15 is a view showing the configuration of a seventh embodiment of the injection molding machine according to the present invention.

A seventh embodiment of the injection molding machine according to the present invention will now be described with reference to FIG. 15.

In addition to the storage battery unit 51 of the fourth embodiment shown in FIG. 10, a transformer 80 for transforming a voltage supplied from a plant into a voltage necessary for the injection molding machine is mounted on a lower frame 13 of a machine base 11, according to the present embodiment.

Also in the present embodiment, the storage battery unit 51 and the transformer 80 can be configured to be enclosed by screens, as shown in FIG. 14 (sixth embodiment), after they are mounted on the lower frame 13 so that the machine can be safely operated after it is connected to the power supply. Further, the storage battery unit 51 of FIG. 10 (fourth embodiment) to be mounted may be replaced with the storage battery unit 61 of FIG. 11 (fifth embodiment).

The invention claimed is:

1. An injection molding machine which comprises an injection device, a mold clamping device, an electric storage device configured to supply electric power to the injection device and/or the mold clamping device, and a machine base, wherein
    the machine base comprises an upper frame, a lower frame, and support means supporting the upper frame on the lower frame,
    the injection device and the mold clamping device are disposed on the upper frame of the machine base,
    the electric storage device comprises a case body and a separate electric storage unit housed in the case body and is disposed on the lower frame of the machine base.

2. The injection molding machine according to claim 1, wherein the electric storage unit is a storage battery.

3. The injection molding machine according to claim 1, wherein the electric storage unit is a capacitor.

4. The injection molding machine according to claim 1, wherein the electric storage unit is enclosed by a plurality of screens.

5. The injection molding machine according to claim 4, wherein a part of each of the screens doubles as the support means of the machine base.

6. The injection molding machine according to claim 4, wherein the screens double as the case body of the electric storage device.

7. The injection molding machine according to claim 6, wherein the case body has a handle.

8. The injection molding machine according to claim 1, wherein the electric storage device is supported by the lower frame of the machine base with a buffer therebetween.

9. The injection molding machine according to claim 1, wherein the electric storage device is disposed on that part of the lower frame of the machine base below the mold clamping device.

10. The injection molding machine according to claim 1, further comprising a transformer, wherein the electric storage device is disposed side by side with the transformer on the lower frame of the machine base.

* * * * *